US008521793B1

(12) United States Patent
Gilsdorf et al.

(10) Patent No.: US 8,521,793 B1
(45) Date of Patent: Aug. 27, 2013

(54) METHOD AND SYSTEM FOR SCALABLE MODULO MATHEMATICAL COMPUTATION

(75) Inventors: Kyle Gilsdorf, Tempe, AZ (US);
Clinton L Hardy, Gilbert, AZ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 906 days.

(21) Appl. No.: 12/457,215

(22) Filed: Jun. 4, 2009

(51) Int. Cl.
*G06F 7/00* (2006.01)
*G06F 15/00* (2006.01)

(52) U.S. Cl.
USPC ............................ 708/200; 708/205; 708/491

(58) Field of Classification Search
None
See application file for complete search history.

(56) References Cited

U.S. PATENT DOCUMENTS

| | | | |
|---|---|---|---|
| 6,085,210 A | 7/2000 | Buer | |
| 6,141,422 A | 10/2000 | Rimpo et al. | |
| 6,973,470 B2 | 12/2005 | Takahashi et al. | |
| 7,320,015 B2 | 1/2008 | Takahashi et al. | |
| 2005/0216700 A1* | 9/2005 | Honary et al. | 712/15 |
| 2007/0073998 A1* | 3/2007 | Chung et al. | 712/11 |
| 2008/0074143 A1* | 3/2008 | Ngai et al. | 326/41 |

* cited by examiner

*Primary Examiner* — Scott Sun
(74) *Attorney, Agent, or Firm* — Davidson Berquist Jackson & Gowdey, LLP (57) ABSTRACT

A math engine is provided capable of supporting large complex mathematical computations, such as modulo math computations involved in cryptography, while remaining easily reconfigurable, upgradeable and scalable. As new algorithms and specifications are desired to be solved, the math engine can be easily updated to accommodate the new requirements. These systems employ layers of cells, wherein individual cells are responsible for calculations. Thus, the complexity of the mathematical computation is broken down into cells which are easily added, removed, changed or substituted. The cells may be interchangeable and programmable, and provide flexibility and reconfigurability to the system at low or near-zero cost. When additional algorithms are desired, additional appropriate cells are simply added or changed.

19 Claims, 6 Drawing Sheets

METHOD AND SYSTEM FOR SCALABLE MODULO MATHEMATICAL COMPUTATION

This relates to mathematics computation and mathematics engines, and more particularly to a scalable, reconfigurable modulo mathematics engine.

INTRODUCTION

Data transferred over an interconnected computer network, such as the Internet, is susceptible to various forms of attack. These attacks may result in such things as loss of privacy, loss of data integrity, identity theft, denial of service, or any combination of these attacks. The ever-expanding popularity of the Internet for secure communications, e-commerce, and various other transactions, has led to the need to ensure communications over non-secure interconnected computer networks are secure from such attacks.

Data transferred over non-secure networks, e.g., the Internet, is often protected from the above-noted attacks by encrypting at the data source, and then decrypting at the data destination. Numerous schemes have been developed and employed to provide such encryption and decryption functionality. Such schemes include the Diffie-Hellman (D-H) Key Exchange, digital signature generation, Rivest-Sahmir-Adelman (RSA) Public Key cryptography, and Elliptic Curve cryptography, for example. In these, as well as other cryptographic schemes, modulo mathematics is integral to the implementation. Cryptographic algorithms, such as these, that use modulo mathematics are quite robust. However, as the size of the encryption and decryption keys used with these algorithms gets larger, the speed at which the algorithms encrypt and decrypt data decreases.

Thus, designers have sought to design various ways of increasing the speed at which these algorithms can process data, and specifically, have attempted to design devices that perform various modulo mathematic operations, such as modular multiplication and exponentiation of extremely large numbers, at higher and higher speeds. Consequently, conventional modulo math engines typically have large complex monolithic designs that have functionality that is hard to maintain and are often designed to solve a singular problem. Conventional implementations typically rely on a single monolithic math engine comprised of large state machines to achieve these complex calculations. As such, when new functionality is desired, it is difficult to add the functionality due to its size and complexity, and sometimes singular purpose. This can pose a challenge whereas many different algorithms may need to be employed, and each time a minor change is made, the math engine has to be updated to support the new functionality. Depending on the level of customization of the math engine, this can be a daunting task.

These conventional math engines can often be fast at solving the problem for which it is originally intended because they are custom-tailored to the application, but they also sacrifice adaptability to new algorithms or new specifications. One example is a large complex monolithic math engine designed purely for solving RSA problems and not easily changeable. Large monolithic math engines such as these are typically not easily reconfigurable, upgraded or adapted to new algorithms, processes and purposes. For example, changing some of these math engines may potentially involve reworking millions of lines of C++ code.

In the field of three-dimensional computer graphics, graphics processors use modular engines that provide more flexibility, but those graphics engines typically solve linear algebra and simple equations, potentially millions of times. Differing in complexity, they typically do not solve large-number math problems such as cryptographic modulo mathematics. Graphics engines solve a different problem. Graphics Engines typically deal with numbers from 32-bits to 64-bits, and the precision of the operations is known ahead of time. These graphics math engines cannot handle large numbers, but rather handle a large set of numbers.

Accordingly, there is a need for a mathematics engine powerful enough to process complex mathematics, such as modulo mathematics involved in cryptography, while remaining easily reconfigurable and adaptable to new algorithms and changing purposes.

DETAILED DESCRIPTION

In the disclosed example, the system is tightly coupled between hardware and microcontroller firmware to process two pipeline packets for high-performance throughput for large or small packets. Each of the controlled hardware blocks has configurable registers that can be programmed by the microcontroller firmware. The architecture provides high performance throughput through the cryptographic core. It has at least two register banks that microcontroller firmware can program to pipeline the packets. The hardware works on the current packet and current register bank while the microcontroller firmware can work on the next packet and next register bank.

Methods and systems in accordance with the present invention provide a math engine capable of supporting large complex mathematical computations, such as modulo math computations involved in cryptography, while remaining easily reconfigurable, upgradeable and scalable. As new algorithms and specifications are desired to be solved, the math engine can be easily updated to accommodate the new requirements.

Methods and systems in accordance with the present invention employ layers of cells, wherein individual cells are responsible for calculations. Thus, the complexity of the mathematical computation is broken down into cells which are easily added, removed, changed or substituted. The cells may be interchangeable and programmable, and provide flexibility and reconfigurability to the system at low or near-zero cost. Such systems present a low-cost approach to designing and redesigning a math solving solution. When additional algorithms are desired, additional appropriate cells are simply added or changed. Consequently, a designer can choose an algorithm most suitably adapted to the problem to be solved without redesigning the entire math engine for each change. These methods and systems realize additional advantages such as support for prototyping, simple testing, and the ability to scale the number of supported functions without any major rework to the original design. A system that supports interchangeable algorithms allows the determination of which solution provides desired performance goals faster than a system that only handles one set of algorithms. Regarding testing, the advantage to using a modular system is the ability to hold certain elements in the system constant and change only the algorithm under test.

On determining that a designer or user wishes to support different algorithms, cells can be changed or placed to accommodate the desired mathematics. Furthermore, as people devise new ways to perform modulo functions, the system can be updated at virtually no cost or very little cost while adding minimal complexity to the design.

In general, methods and systems in accordance with the present invention break a received computational problem down to smaller problems, and then solve those smaller problems or iteratively break them down into even smaller problems to be solved. When breaking down a problem into smaller and smaller problems, they pass them to lower-level cells to process the smaller problems until the complex problem is solved by individual cells each solving simpler problems.

Generally, a math computation request is received by the higher-level cells, and broken down into smaller, simpler distinct parts or sub-problems and passed to lower-level cells for each distinct part to be solved. These parts may be further broken down into even smaller, simpler parts, and passed to even lower-level cells on a lower layer to be processed and calculated. This process may continue to the lowest-level cells until the calculations are completed and results are computed. Then, the resulting computed values are passed back to the high-level cells which use the completed lower-level calculations to complete the computations the higher-level cells are responsible for. Further, the higher-level cell calculations are passed back to the originating highest-level cell, and ultimately back to the processor or entity that made the original request. Effectively, a math problem is continually broken down to smaller and smaller problems which are each solved and the results ultimately returned to the original cell which calculates a final result and returns it to the processor.

This math engine differs from those conventional three-dimensional graphics processor engines at least because they handle large numbers. Again, graphics engines deal in fixed variable sizes and limited sets, whereas cryptographic engines do not have this limitation. Cryptographic engines input values of any size, including, for example, sizes ranging from 1-bit to 1-million bits or more.

Methods and systems in accordance with the present invention may be utilized in any combination of hardware and/or software, for example, on an application-specific integrated circuit (ASIC), as part of an encryption and/or decryption system, or as a stand-alone modulo mathematics computer.

Figure 1:
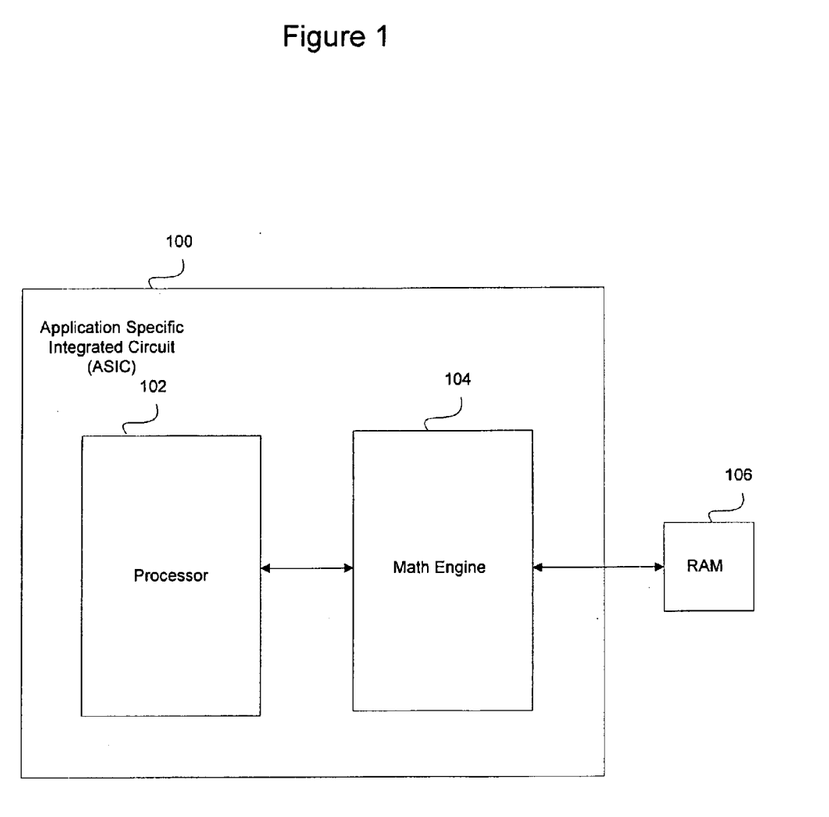
FIG. 1 depicts an exemplary math engine on an ASIC or computer chip in accordance with methods and systems consistent with the present invention.

FIG. 1 depicts an exemplary math engine 104 on an ASIC 100 or computer chip in accordance with methods and systems consistent with the present invention. As FIG. 1 illustrates, the ASIC 100 includes a processor 102, and a math engine 104. The processor 102 acts as a high-level control unit for the chip and may implement the control logic of flow of data into the math engine 104. The processor 102 is coupled to the math engine 104 and is operable to transfer data to, and receive data from, the math engine 104. Also shown is a Random Access Memory (RAM) 106 which the math engine 104 may access, for example, for storage and receipt of variables and values used in processing the computation request. The math engine 104 may comprise hardware, software or any combination thereof. In one implementation, the math engine 104 may be a hardware component on an ASIC, and in another implementation, the math engine may be comprised of software running on a computer or other data processing device. Any other component may also be hardware or software of any combination thereof. Also, although useful for modulo mathematics, other mathematics may also be processed.

Figure 2:
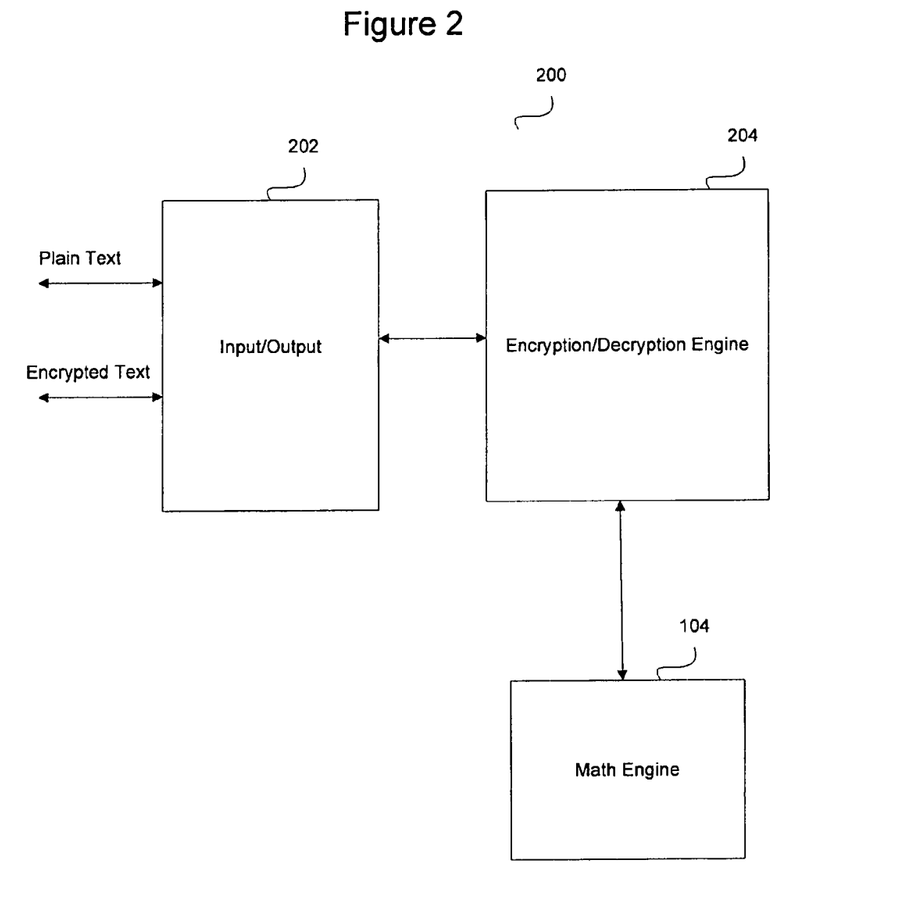
FIG. 2 depicts a block diagram of a second exemplary environment as part of an encryption/decryption system.

FIG. 2 depicts a block diagram of a second exemplary environment, that is, as part of an encryption/decryption system 200. As FIG. 2 illustrates, the system 200 includes an input/output (I/O) interface 202, an encryption/decryption engine 204, and a math engine 104. The I/O interface 202 is coupled to the encryption/decryption engine 204 and is operable to transfer data to, and receive data from, the encryption/decryption engine 204. In particular, the I/O interface 202 receives plain text data or encrypted data from a source and transfers this data to the encryption/decryption engine 204, and receives encrypted or decrypted data from the encryption/decryption engine 204 and transfers this data to its intended destination. The I/O interface 202 may be any I/O interface that performs this function.

The encryption/decryption engine 204, as was noted above, is coupled to the I/O interface 202 and either encrypts or decrypts the data received from the I/O interface 202. The encryption/decryption engine 204 then transfers the encrypted or decrypted plaintext data to the I/O interface 202 for transfer elsewhere. It will be appreciated that the encryption/decryption engine 204 may be any one of numerous hardware or software encryption/decryption devices that implement any one of numerous encryption/decryption schemes. Non-limiting examples include an encryption/decryption engine 204 that implements the RSA Public Key cryptography scheme, the D-H Key Exchange scheme, and Elliptic Curve cryptography.

The math engine 104 is coupled to the encryption/decryption engine 204 and is configured to perform, for example, modulo mathematic operations used to implement the encryption/decryption scheme carried out by the encryption/decryption engine 204. For example, if the encryption/decryption scheme implemented by the encryption/decryption engine 204 is the RSA scheme, the math engine 104 performs various modulo exponentiations.

Figure 3:
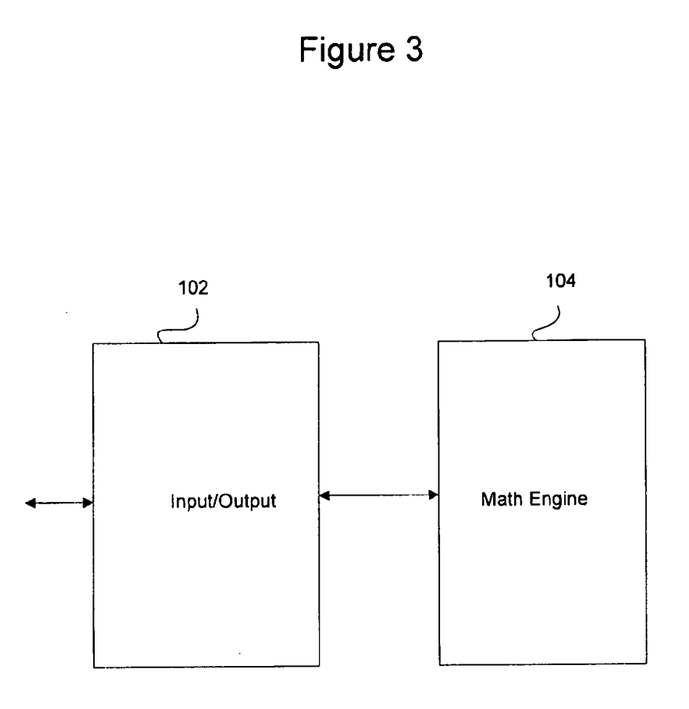
FIG. 3 illustrates a third exemplary environment, a stand-alone modulo mathematics engine computer.

FIG. 3 illustrates a third environment mentioned above, a stand-alone modulo mathematics engine computer. One such computer 200 includes the I/O interface 202 and the math engine 104. With this implementation, the I/O interface 202 receives, for example, modulo mathematic requests from a source and transfers each to the math engine 104. The math engine 104, which is coupled to the I/O interface 202, receives the arguments, performs desired modulo mathematic operations thereon, and outputs the result to the I/O interface 202. The I/O interface 202 receives the result from the math engine 104 and transfers it to the intended destination.

Figure 4:
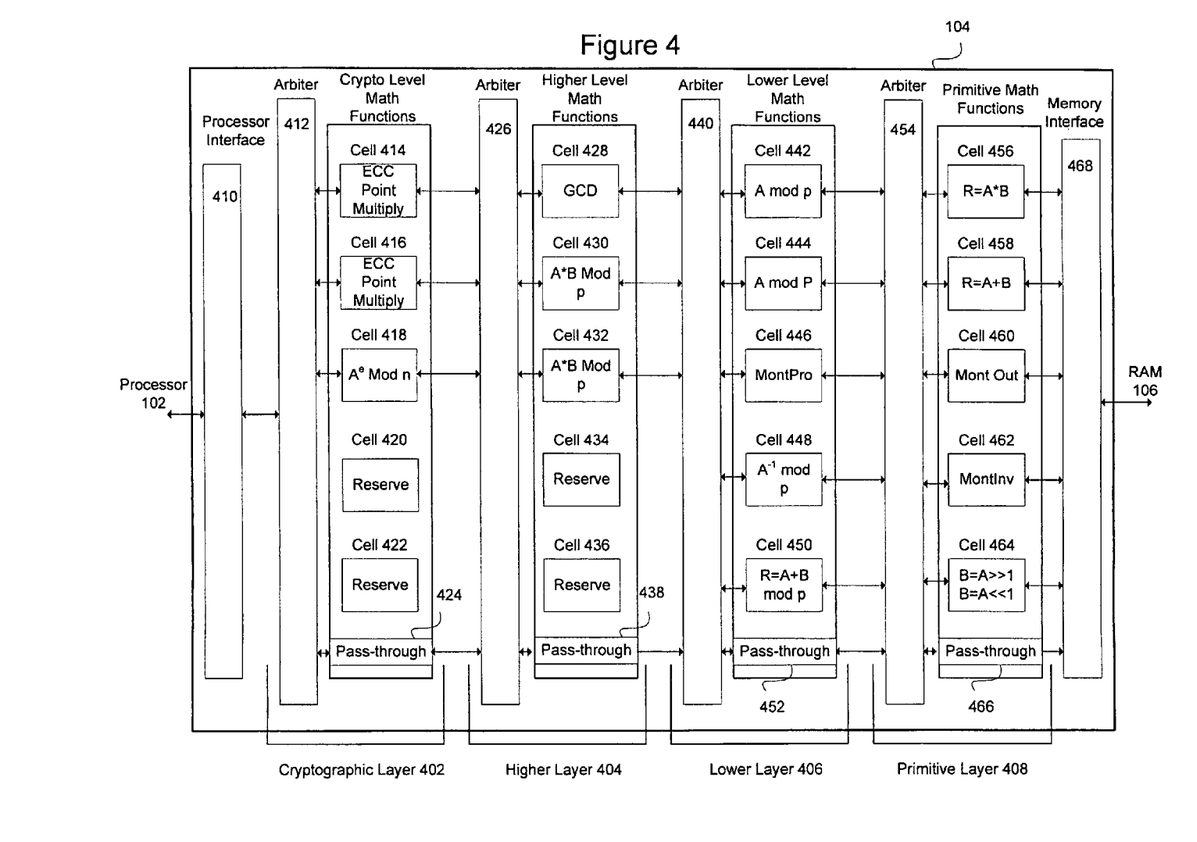
FIG. 4 depicts an exemplary math engine in accordance with methods and systems consistent with the present invention.

FIG. 4 depicts an exemplary math engine 104 in accordance with methods and systems consistent with the present invention. In this implementation, a math engine 104 on an ASIC is described. Generally, the architecture of the math engine 104 is divided into several layers, e.g., cryptographic 402, high 404, low 406, and primitive 408. Any of the cells in the upper layers can access the cells on the layers below it, which allows for the chaining of complex and simple function calls to support large computations. It also allows a host processor to call any or all desired cells individually to achieve the desired computation. The processor 102 has access to every function in the math engine 104. This allows the processor 102 to rely on the math engine 104 for complex problems or small problems. If it is determined that the desired functionality does not exist in the math engine 104 at higher levels, the processor can use the primitive functions to implement that algorithm desired without the designer having to design a new cell. However, the functionality required by the end user ideally exists in one of the math engines higher level functions. Several of the components are described below, and in one implementation, these components are implemented as hardware, e.g., gates on an ASIC.

The math engine 104 implements, for example, Elliptic Curve Cryptography (ECC) Binary Field Key Exchange, Elliptic Curve Cryptography Prime Field Key Exchange, Digital Signature Algorithm (DSA), RSA, and primality checks. However, many other implementations are possible.

The processor interface 410 interfaces with the processor 102 to receive the math computation request. The processor 102 writes the value of input parameters into memory and passes pointers, e.g., 16-bit addresses, to where the input parameters have been placed. The math engine passes pointers to the variables to lower level math functions (cells). The primitive level functions use these pointers to pull the data from memory and compute the requested operation. For example, in a high-level operation, the processor 102 may pass a pointer to a file to be decrypted. The information and variables, e.g., raw data and where it is stored, received by the math engine 104 from the processor 102 come through the processor interface 410. In one implementation, to save time and computing expense, some variables, values and constants are already known by the math engine 104, such as government-mandated or recommended values that are typically used to meet government security requirements.

Furthermore, the arbiter 412 of the cryptographic layer 402 receives the request from the processor interface 410 and decides if the transaction is bound for the first layer, the cryptographic layer 402 in this example, or not. To make this decision, the arbiter 412 consults the Global Map Table (not shown) which is a table of math functions that the math engine 104 can access and that describes the location and cells of the various functions. In one implementation, it is a 16k register map. If the request is to be processed by a cell or cells 414-422 on the cryptographic layer 402, the arbiter 412 passes the request to that cell. If not, the arbiter 412 passes the request to the pass-through 422 to the next lower-level arbiter 424.

The layers 402-408 comprise a cell or group of multiple cells (414-422, 428-436, 442-450, 456-64) which either solve and/or break down the math problem into simpler problems, typically until it is a group of simple problems on the primitive level 408. A layer 402-408 may comprise cells that are conceptually on similar levels of complexity, e.g., high-level cryptographic functions on one layer and simple primitive functions on another layer.

In one implementation, the cells on a given layer may be software, e.g., lines of code, or hardware, e.g., ASIC gates. A cell comprises a math function that either performs a specific function and/or calls a function or functions below it. The cell may also comprise a state machine or a group of state machines which determine what sub-functions need to be called. Cells may also include a list of functions that the cell is going to call, and they have a function pointer to direct to where the functions exist. When the cell below it returns a result back to that cell, the original calling cell determines what step is next. When a cell submits a function call to another cell below, the arbiter on the calling cell's level looks up where the function exists in the global map table and determines whether it exists on that level or a lower level. Higher-level cells piece answers together when results are returned from lower-level cells. An example cell may be a division algorithm.

In addition, cells may be programmable. For example, logic in a cell may be programmable if a cell comprises a field-programmable gate array (FPGA), to allow for interchangeability and to facilitate the change and addition of cells. Programmable cells may be simple state machines. Alternatively, in one implementation, a cell could be its own embedded processor with the ability to download a new algorithm. Instead of reprogramming millions of lines of C code, the designer may only have to redesign one function. Furthermore, in one embodiment, a cell can also be a larger monolithic engine itself. Although only a certain number of cells are shown on the Figure, any number of cells may be used.

In one implementation, the cryptographic layer 402 is responsible for doing large calculations, such as those used in implementing various cryptography related functions such as, for example Elliptic Curve Cryptography (ECC) Prime Field Point Multiply for D-H (ECDSA) Key Exchange and Elliptic Curve Digital Signature Algorithm (ECDSA), primality checks, etc. To implement these, the cryptographic layer cell calls each of the required cells in the lower layers in the appropriate order. Exemplary cryptographic layer functions include, for example, point multiply for binary curves 414, point multiply for prime curves 416, and modular exponentiation 418 which compute points along a given elliptic curve given a set of starting points and a scalar indicating the distance to move. Elliptic curve cryptography is described in greater detail in Hankerson et al., "The Guide to Elliptic Curve Cryptography," Springer, 2004 which is herein incorporated by reference.

The higher and lower layers 404, 406 are used to support less complex functions and typically rely upon even lower layer functions to achieve the desired computation. For example, modulo-based arithmetic may be implemented at these levels. The higher layer 404, for example, may include cells such as greatest common divisor 428, modular multiplication 430, and binary polynomial modular multiplication 432. For example, the modular multiplication cell 430 would call the primitive multiplication cell followed by the lower level reduction algorithm to bring it within range of the modulus. A greatest common divisor cell 428 might rely on a large number of shifts and additions to achieve its goals. Cells on the lower layer 406 may include barret modular reduction 442, general modular reduction 444, modular add and subtract 450, modular inversion 448, and Montgomery Product 446. Key components to modulo mathematics are reduction and inversion functions. The inversion cell 448 is responsible for determine A-1 in the following equation AA-1RmodN=1. By knowing this, some basic mathematical substation principles can be used to achieve highly complex reductions in a short period of time. In fact, the Montgomery Product relies on the computation of pre-computation to achieve its accelerated version of a modular multiplication algorithm.

In one implementation, the primitive layer 408 is responsible for memory accesses. In this implementation, all higher-level functions, or cells, rely on the primitive-level memory interface 468 to access the memories. This makes memory access timing much easier and allows for higher clock speeds. Some potential operations for these cells 456-464 are bit-level manipulations, shifts, fetches, copying and zeroing. Some exemplary cells include addition/subtraction 458, shift left/shift right 464, get bit/set bit, integer comparison, multiplication 456, Montgomery Inversion 462, Montgomery Out 460, polynomial multiplication, and polynomial reduction. The Montgomery Out 460 and Montgomery Inversion 462 are accelerated versions of complex functions put at the primitive layer to increase computation speed. Cells (414-422, 428-436, 442-450) in the layers above the primitive layer 408 program the cells in the layers below them through register reads and writes.

The primitive layer 408 accesses the memory 106 through the memory interface 466. In one implementation, it is the only layer that accesses the memory 106 directly. In the interest of speed, smaller fast cell functions on the primitive layer 408 access the memory directly, thereby limiting complex functions accessing the memory 106 and increasing overall speed. In one implementation, all functions are eventually passed to the primitive layer 408 as a problem is broken down further and further.

The memory interface 468 provides access to the RAM 106, and variables for a given math computation are stored in RAM. The RAM 106, however, may not be needed if the math engine 104 is implemented in software.

Figure 5:
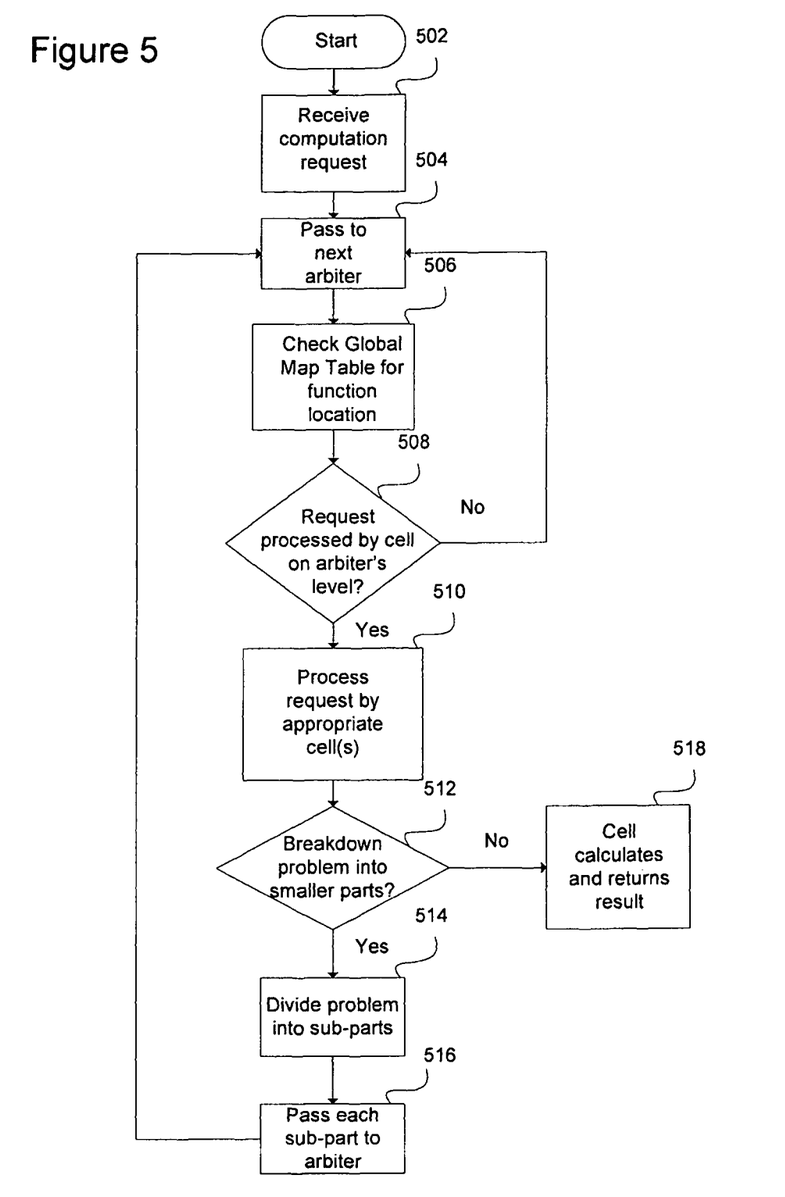
FIG. 5 illustrates exemplary steps in a method for processing a math engine computation request.

FIG. 5 illustrates exemplary steps in a method for processing a math engine 104 computation request. First, the math computation request is input to the processor interface 410 from the processor 102 (step 502). Then, the computation request passes from the processor interface 410 to the first arbiter 412 (step 504). The arbiter 412 then checks the Global Map Table for the location of the function (step 506) to decide if the request is to be processed on that layer 402 or passed to the next lower layer 404 (step 508). If the request is passed to the next lower layer 404, it goes through the pass-through 422 to the arbiter 424 on the next lower layer (step 504). If it is not passed through, it is given to one or more of the cells 414-428 on that layer 402) to be processed (step 510). The cell or cells receiving the request decide if and how to break down the received math computation into smaller sub-parts (step 512). If the cell does not need to break the problem down, it may calculate and return the result (step 518).

Alternatively, the cell decides to divide the problem into different parts (step 514). The cell is a state machine that has a predetermined set of steps for any given algorithm implemented for that cell. For example, for a modular multiplication, the cell would call a multiply function followed by a reduction function. For each part, it either solves the part or passes that part to the arbiter on its layer if that part is not to be solved by that cell (steps 516 and 504). The sub-parts go back to the arbiter which then goes back to the calling function/cell. The arbiter on that level will then determine if that part is solved on that layer (step 506 and 508). If not, it passes it to the arbiter on the next lower-level through the pass-through (step 504). This process will repeat (steps 504-508) until the sub-part reaches the arbiter on the layer that has the cell that will process that part (steps 508 and 510). Then, the appropriate cell processes the sub-part as described above with respect to the first cell (step 510 and 518) and described further below.

Figure 6:
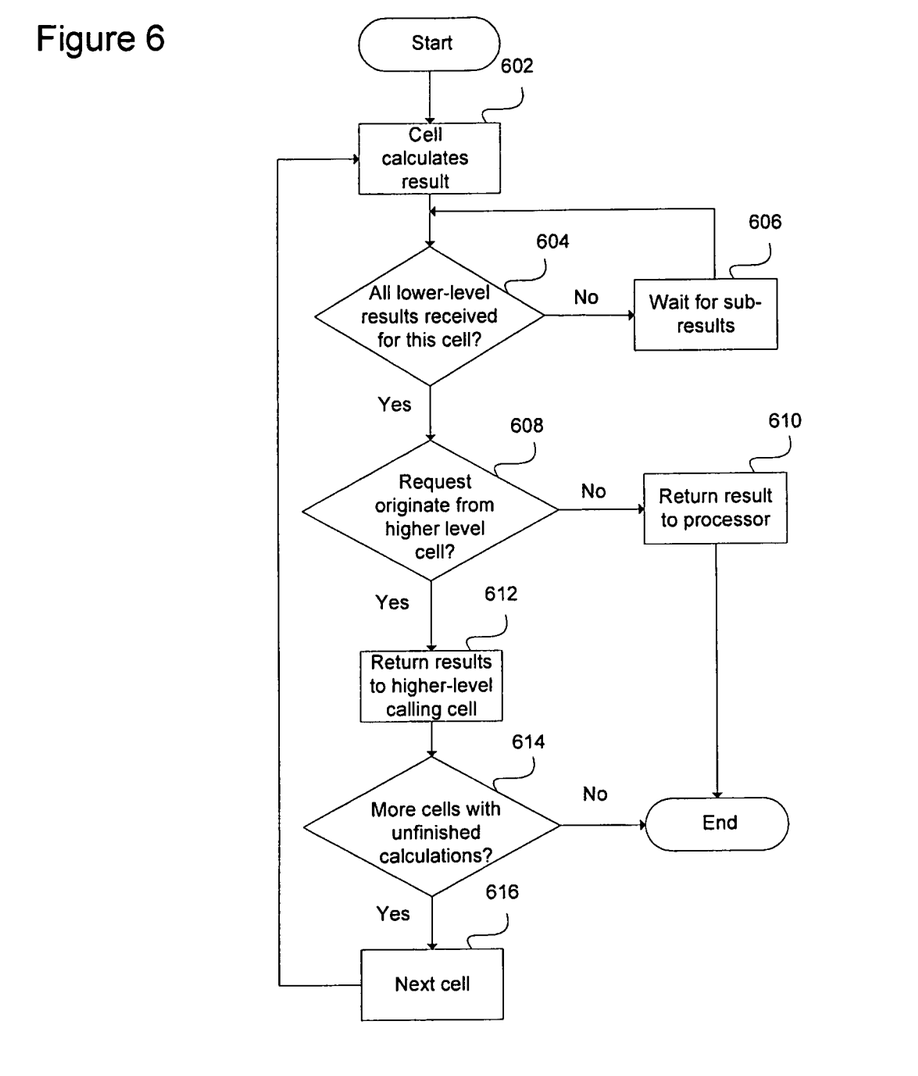
FIG. 6 illustrates exemplary steps in a method for processing computation requests by cells in accordance with methods and systems consistent with the present invention.

FIG. 6 illustrates exemplary steps in a method for processing computation requests by cells in accordance with methods and systems consistent with the present invention. When a cell (for example cell 430) receives a computation request intended for that cell that does not need to be broken down any further, it calculates the result of that request (step 602). If the cell has called other cells below it (for example cells 456 and 58) (step 604), it may wait for results from those lower cells to produce a final result (step 606). In the event that the cell's original computation request originated from a high-level cell (for example cell 414) (step 608), the cell then returns the results to that higher-level cell (step 612). In one implementation, after the cell (for example 430) solves its part of the problem, it leaves the result in memory so that the next function or cell can access the results. An interrupt indicates that the result is ready.

If the request did not originate from any higher-level cell, the ultimate results are returned to the processor 102 or entity that made the original request. In one implementation, this is performed by leaving the results in a RAM 106 and returning a pointer to the results. When the result is ready for the higher-level cell (for example 414) that passed the computation sub-part request below, the higher-level cell is notified by an interrupt, and the cell (for example 414) uses that result to process its final result to pass to whichever cell called it, or alternatively finally out to the processor 102 through the processor interface 410. This process reiterates in parallel until, in one implementation, all cell calculations (steps 614, 616 and 602) and computation requests, including subparts, have been calculated and returned. Effectively, higher-level cells compile answers from the lower-level cells and determine the final result. In one implementation, all problems are eventually broken up into problems that are solved by cells on the primitive layer 408.

The foregoing description of preferred embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

What is claimed is:

1. A data processing system having a reconfigurable modulo mathematics engine, comprising:
   the reconfigurable modulo mathematics engine configured to perform modulo mathematics comprising:
   an input configured to receive a mathematics computation request;
   an arbiter configured to:
      receive the mathematics computation request;
      determine a first reconfigurable cell to send the mathematics computation request to; and
      send the mathematics computation request to the determined first reconfigurable cell;
   the first reconfigurable cell configured to:
      divide the mathematics computation request into other smaller mathematics computation requests; and
      send one or more of the other smaller mathematics computation requests to the arbiter; and
   a second reconfigurable cell configured to:
      receive one or more of the other smaller mathematics computation requests from the arbiter; and
      process one or more of the received other smaller mathematics computation requests.

2. The data processing system of claim 1, wherein the second reconfigurable cell returns results of the processing of the received one or more other smaller mathematics computation requests to the first reconfigurable cell.

3. The data processing system of claim 1, further comprising an output, and wherein the first reconfigurable cell returns results to the output.

4. The data processing system of claim 1, wherein one or more cells are configured to perform modulo math functions.

5. The data processing system of claim 1, further comprising one or more other cells that process one or more of the other smaller mathematics computation requests.

6. The data processing system of claim 5, wherein each cell processes one or more of the other smaller mathematics computation requests by dividing the request into second smaller requests, and performing on each one of the second smaller requests one of: (1) processing the smaller request and (2) sending the smaller request to a different cell to process.

7. The data processing system of claim 6, wherein each second smaller request is sent to an arbiter to be sent to the different cell to process the smaller request.

8. The data processing system of claim 1, wherein each cell waits for results to be returned to the cell by other cells.

9. The data processing system of claim 8, wherein each cell returns that cell's results to a different cell that called the cell.

10. The data processing system of claim 1, further comprising:
 a map table indicating functions of cells in the mathematics engine.

11. The data processing system of claim 10, wherein arbiters in the mathematics engine access the map table to determine locations of cells in the mathematics engine.

12. The data processing system of claim 10, wherein cells referenced in the map table are arranged in a non-linear hierarchical structure.

13. The data processing system of claim 12, wherein the non-linear hierarchical cells are arranged in layers and accessed in parallel.

14. The data processing system of claim 1, wherein the received mathematics computation request is any size.

15. The data processing system of claim 1, further comprising a second arbiter on a different layer from the first arbiter, and wherein the second cell is on the layer of the second arbiter.

16. A method in a reconfigurable modulo mathematics engine, comprising:
 receiving a mathematics computation request by the modulo mathematics engine configured to perform modulo mathematics;
 determining a first reconfigurable cell configured to process the mathematics computation request;
 sending the mathematics computation request to the first reconfigurable cell to be processed;
 dividing the mathematics computation request into smaller mathematics computation requests by the first reconfigurable cell;
 determining one or more other reconfigurable cells to process the smaller mathematics computation requests;
 sending the smaller mathematics computation requests to the one or more other reconfigurable cells;
 processing the smaller mathematics computation requests by the one or more other reconfigurable cells; and
 returning results of the processing of the smaller mathematics computation requests to the first reconfigurable cell.

17. The method of claim 16, wherein the processing the processing of the smaller mathematics computation requests includes processing a modulo mathematics computation.

18. The method of claim 16, wherein the processing of the smaller mathematics computation requests includes:
 performing for each smaller mathematics computation request one of: (1) processing the smaller mathematics computation request and (2) sending the smaller request to a different cell to process 19. The method of claim 16, further comprising:
 accessing a map table indicating functions of cells in the mathematics engine, wherein the cells are arranged in a non-linear hierarchical structure.

\* \* \* \* \*